United States Patent
Saito et al.

[11] Patent Number: 6,128,158
[45] Date of Patent: Oct. 3, 2000

[54] MAGNETIC RECORDING/REPRODUCING APPARATUS

[75] Inventors: Shoichiro Saito; Mikio Oka, both of Miyagi-ken, Japan

[73] Assignee: Alps Electric Co., Ltd., Tokyo, Japan

[21] Appl. No.: 09/249,233

[22] Filed: Feb. 11, 1999

[30] Foreign Application Priority Data

Feb. 23, 1998 [JP] Japan ................................. 10-039965

[51] Int. Cl.⁷ ............................................... G11B 15/675
[52] U.S. Cl. ............................................................. 360/96.5
[58] Field of Search ................................ 360/96.5, 96.6

[56] References Cited

U.S. PATENT DOCUMENTS

| | | | |
|---|---|---|---|
| 4,259,702 | 3/1981 | Franke | 360/96.5 |
| 4,447,840 | 5/1984 | Mignolet et al. | 360/137 |
| 4,704,651 | 11/1987 | Nagaya et al. | 360/137 |
| 4,984,112 | 1/1991 | Kletzl et al. | 360/96.6 |
| 5,371,639 | 12/1994 | Bryer | 360/96.5 |
| 5,440,435 | 8/1995 | Busengdale et al. | 360/96.5 |

*Primary Examiner*—Robert S. Tupper
*Attorney, Agent, or Firm*—Brinks Hofer Gilson & Lione

[57] ABSTRACT

A magnetic recording/reproducing apparatus including a detecting member which is operated to rotate a drive source disposed in a housing, and a slidable operating member for operating the detecting member. By simply pressing an indicator portion of the operating member with a small force from the front face side of the housing, the cartridge 4 is easily ejected by electrical power as a result of rotation of the drive source. In conventional magnetic recording/reproducing apparatuses, when the cartridge, loaded in the apparatus, is ejected therefrom, the back end of the cartridge must be firmly gripped to pull it out. Therefore, more force is required to pull out the cartridge than is required to insert it, making it very difficult to pull out the cartridge. The magnetic recording/reproducing apparatus of the invention overcomes this problem.

6 Claims, 12 Drawing Sheets

MAGNETIC RECORDING/REPRODUCING APPARATUS

BACKGROUND OF THE INVENTION

1. Field of the Invention

The present invention relates to a magnetic recording/reproducing apparatus, and, more particularly, to a mechanism for ejecting a loaded cartridge containing a magnetic tape by electrical power.

2. Description of the Related Art

A description will now be given of a conventional magnetic recording/reproducing apparatus with reference to FIGS. 18 and 19A and 19B. FIG. 18 is a plan view of the conventional magnetic recording/reproducing apparatus. FIG. 19A is a sectional view taken along line 19A—19A of FIG. 18, and FIG. 19B is a side view of the main portion of the conventional magnetic recording/reproducing apparatus of FIG. 19A.

The conventional magnetic recording/reproducing apparatus 31 (hereinafter referred to as "apparatus 31") comprises a base plate 31a at the bottom portion thereof, and a pair of opposing rail-like guide members 31b and 31c having a U-shaped groove. In FIG. 18, the guide members 31b and 31c are disposed at the top right and the bottom right sides of the apparatus 31.

As shown in FIG. 19A, a pair of openings 31d are formed in the portion of the base plate 31a where the guide members 31b and 31c are disposed.

At the right end of the magnetic recording/reproducing apparatus of FIG. 19A is formed an opening 31e for inserting therein a cartridge 33 (described later) into the magnetic recording apparatus as a result of guiding a bottom plate 33c of the cartridge 33.

At the back side of the base plate 31a at which the guide members 31b and 31c are disposed is provided a pair of largely resilient plate springs 32, one end of each being screwed and the other end of each being a free end. At the free end of each plate spring 32 is provided a stopper portion 32a formed by bending the free end of each plate spring 32. Stopper rollers 32b are rotatably supported by their corresponding stopper portions 32a.

Each stopper roller 32b is disposed at its associated opening 31d in the base plate 31a, and is vertically movable in its associated opening 31d, with its associated screwed portion as fulcrum.

The cartridge 33, indicated by alternate long and two short dashed lines in FIGS. 18 and 19A and 19B, is inserted from the insertion opening 31e and guided along the guide members 31a and 31b in order to be loaded in the apparatus 31. The cartridge 33 contains a magnetic tape 33a therein, and, as shown in FIG. 19B, has a pair of U-shaped guide grooves 33b at both outer sides thereof. The pair of guide grooves 33b are guided along the aforementioned rail-like guide members 31b and 31c in order to guide the cartridge 33 into the apparatus 31.

A cutout 33d is formed in the portion of the bottom plate 33c in which each of the guide grooves 33b of the cartridge 33 is formed. A pinch roller 33f is rotatably disposed in the cartridge 33 in order to transport the magnetic tape 33a horizontally through a tape advancing belt 33g.

A magnetic head 34 and a transporting roller 35 are disposed in the apparatus 31.

In order to load the cartridge 33 into the apparatus 31, one end of the cartridge 33 is inserted manually from the opening 33e in the apparatus 31, in the direction of arrow D.

This causes the one end of the bottom plate 33c of the cartridge 33 to bump into the stopper rollers 32b provided at their respective plate springs 32.

From this state, when the cartridge 33 is pushed further into the apparatus 31 with a stronger force, the bottom plate 33c of the cartridge 33 pushes the stopper rollers 32b downward, causing the plate springs 32 to be flexed downward and the stopper rollers 32b to come into resilient contact with the under side of the bottom plate 33c.

When the cartridge 33 is pushed even further into the apparatus 31, the rollers 32b, which were pushed down by the under side of the bottom plate 33c, move upward into the cutout 33d of the cartridge 33 as a result of a large resilient force produced by the plate springs 32. When this happens, each stopper roller 32b comes into resilient contact with an edge defining the cutout 33d, and pushes it obliquely upward in the direction of arrow C. This causes the pinch roller 33f of the cartridge 33 to press-contact the transporting roller 35 in the apparatus and to stop moving, whereby the cartridge 33 is loaded in the apparatus 31.

With the pinch roller 33f being press-contacted against the transporting roller 35, rotation of the transporting roller 35 causes rotation of the pinch roller 33f, allowing the magnetic tape 33a to be run horizontally through the tape advancing belt 33g in the cartridge 33.

When the cartridge 33 is loaded into the apparatus 33, a command from, for example, an external computer (not shown), is transmitted to rotate the transporting roller 35, allowing predetermined information to be recorded onto or reproduced from the magnetic tape 33a by a magnetic head 34.

The cartridge 33 is ejected from the apparatus 31 by manually and strongly pulling in the direction of arrow E the back end 33e of the cartridge 33 protruding out from the apparatus 31 of FIG. 18. When this is done, the stopper rollers 32b move downward and out from the cutout 33d of the cartridge 33, whereby the cartridge 33 is removed from the apparatus 31.

However, in the above-described conventional apparatus 31, since the installation and removal of the cartridge 33 are carried out manually, the plate springs 32 are required to provide a large resilient force. As a result, a large force (of approximately 1.5 to 3 Kgf) is required for cartridge 33 installation and removal, making it extremely difficult for a disabled operator to install and remove the cartridge 33.

In comparing the amount of force required to install and remove the cartridge 33, more force is required to remove the cartridge 33 than is required to insert it because the operator must strongly grip the rear end 33e of the cartridge 33 in order to pull it out of the apparatus 31. As a result, it is more difficult to remove the cartridge 33 than to insert it.

SUMMARY OF THE INVENTION

To overcome the aforementioned problems, according to a first form of the magnetic recording/reproducing apparatus of the present invention, there is provided a magnetic recording/reproducing apparatus for a cartridge containing a magnetic tape therein, the apparatus comprising:

a first slide member for sliding the cartridge in order to load or unload the cartridge;

a second slide member for sliding the first slide member;

a drive source for sliding the second slide member;

a housing for separately and slidably supporting the first slide member and the second slide member;

a detecting member, disposed in the housing, for driving the drive source;

a slidable operating member for operating the detecting member, the operating member being formed of a light-guiding material; and a light-emitting member for emitting illumination light depending on the state of operation of the cartridge; wherein the illumination light from the light-emitting member enters the operating member, which guides the illumination light outwardly of the housing to indicate the operation state.

To overcome the aforementioned problems, according to a second form of the invention, the operating member may comprise an indicator portion at the front end face thereof situated outside the housing, a side wall for allowing the illumination light from the light-emitting member to enter therein, and a reflecting portion situated at the back end face thereof in order to bend the illumination light that has entered the side wall towards the indicator portion, whereby the illumination light, which has entered the operating member, is guided towards the indicator portion by the reflecting portion.

To overcome the aforementioned problems, according to a third form of the invention, the reflecting portion may comprise a flat, inclined surface covered with a reflecting material, the inclined surface being formed at the back end of the operating member, in order to bend and guide the illumination light that has entered from the side wall of the operating member towards the indicator portion.

To overcome the aforementioned problems, according to a fourth form of the invention, the light-emitting member may be made to emit light during at least one of standby prior to recording or reproducing operations carried out on the magnetic tape contained in the cartridge loaded in the apparatus, or recording or reproducing operations carried out on the magnetic tape.

To overcome the aforementioned problems, according to a fifth form of the invention, the light-emitting member and the detecting member may be mounted on the same board such that the detecting member is disposed near the light-emitting member, with the illumination light from the light-emitting member entering the operating member, and the operating member sliding to operate the detecting member, which causes the drive source to be driven, whereby the cartridge, installed in the apparatus, is ejected.

To overcome the aforementioned problems, according to a sixth form of the invention, the detecting member may comprise a nonlock type switch having a restoring spring therein. After operating the detecting member as a result of sliding the operating member towards the inner portion of the housing, the operating member may be made to slide and return back to the front face side of the housing due to the restoring spring.

DESCRIPTION OF THE PREFERRED EMBODIMENT

Figure 1:
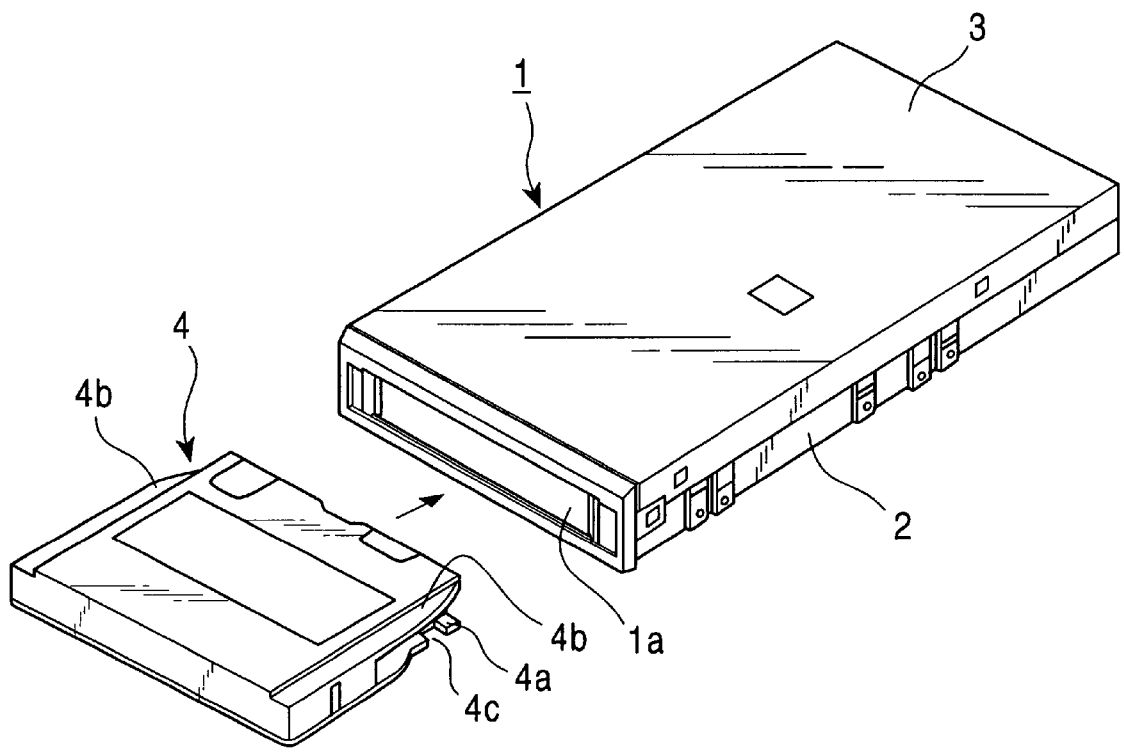
FIG. 1 is a schematic perspective view of the magnetic recording/reproducing apparatus in accordance with the present invention, and the cartridge used in the magnetic recording/reproducing apparatus.

A description will now be given of an embodiment of the magnetic recording/reproducing apparatus in accordance with the present invention, with reference to FIGS. 1 to 17. As shown in the perspective views of FIGS. 1 and 2, in general, the magnetic recording/reproducing apparatus 1 (hereinafter referred to as "apparatus 1") of the present invention comprises a housing 2 having a substantially rectangular external shape and having various component parts (described later) mounted to the inside thereof; a cover 3 for covering the top portion of the housing 2; and a cartridge insertion opening 1a formed in the front face of the housing 2.

A cartridge 4, for being loaded in the apparatus 1, contains a magnetic tape 4d therein. It has at both side outer surfaces thereof a bottom guide portion 4a and a top guide portion 4b, for guiding the cartridge 4 into the apparatus 1. An engaging portion 4c, being a cutout, is provided in each bottom guide portion 4a.

Figure 2:
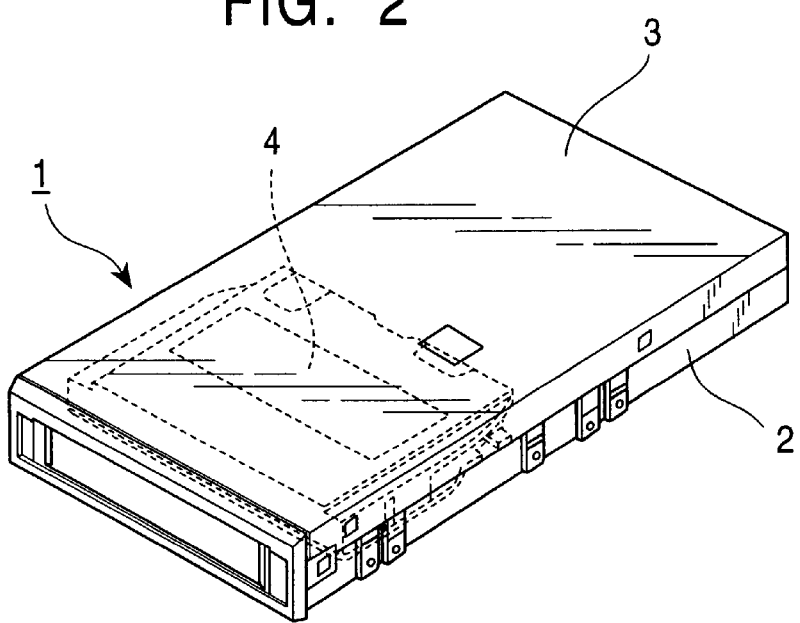
FIG. 2 is a schematic perspective view of the magnetic recording/reproducing apparatus with the cartridge loaded therein.

FIG. 2 illustrates the appearance of the magnetic recording/reproducing apparatus when the entire cartridge 4 is completely inserted into the apparatus 1.

Figure 3:
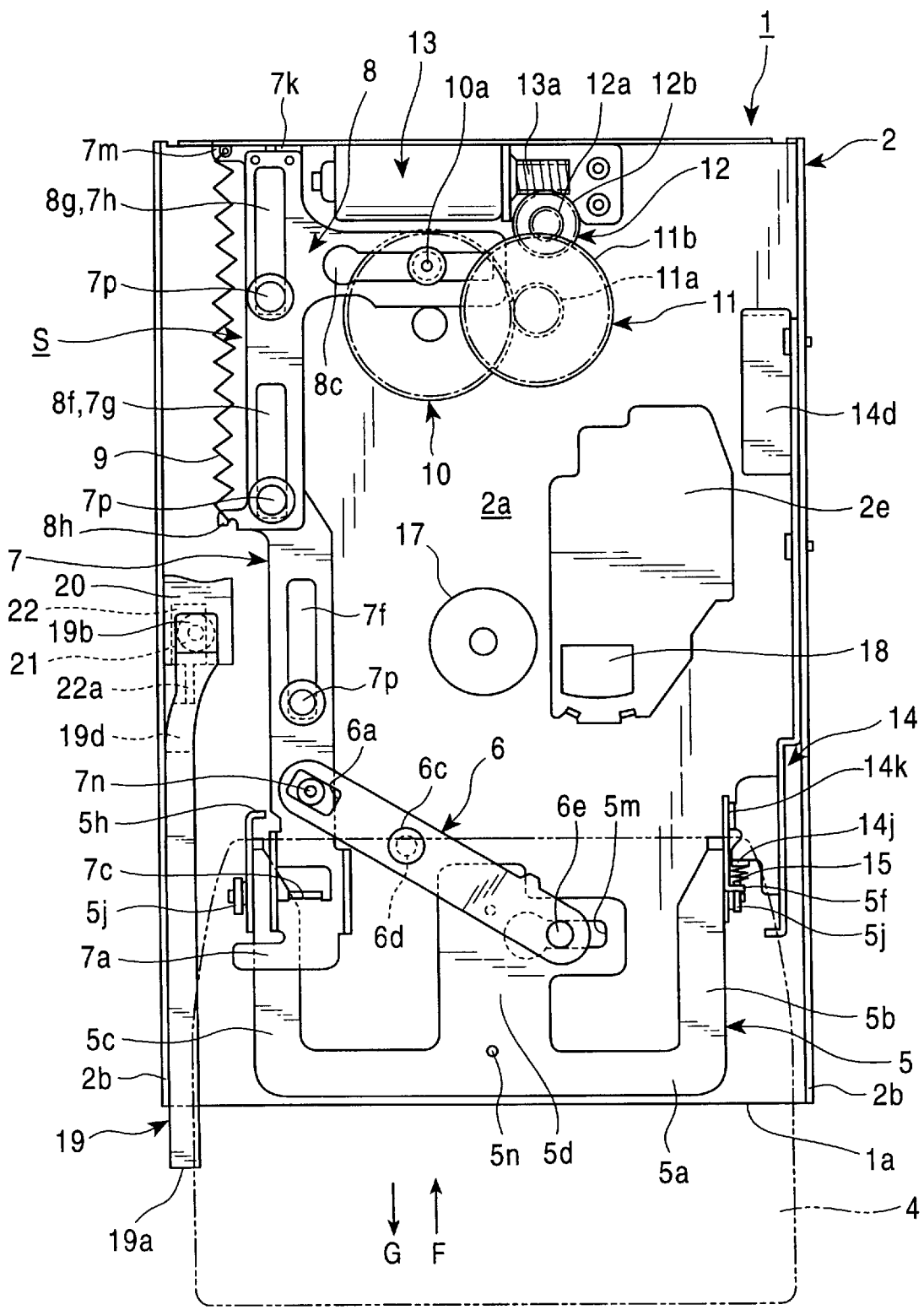
FIG. 3 is a schematic top view illustrating the inside of the housing of the magnetic recording/reproducing apparatus in accordance with the present invention.

A description will now be given in detail of the structure of the above-described apparatus 1, with reference to FIGS. 3 to 17. FIG. 3 is a schematic top view of the magnetic recording/reproducing apparatus without the cover, illustrating the inside of the apparatus as viewed from the top thereof.

The apparatus 1 of the invention comprises a housing 2 accommodating a plurality of component parts. As shown in the top view of FIG. 4 and the front view of FIG. 5, the housing 2 has a rectangular external shape. It is formed by carrying out pressing, for example, a metallic plate in order to punch and bend it.

The housing 2 has a substantially flat bottom plate 2a at the bottom portion thereof, with the sides of the bottom plate 2a being bent upwards to form a pair of opposing side plates 2b and 2b.

Figure 4:
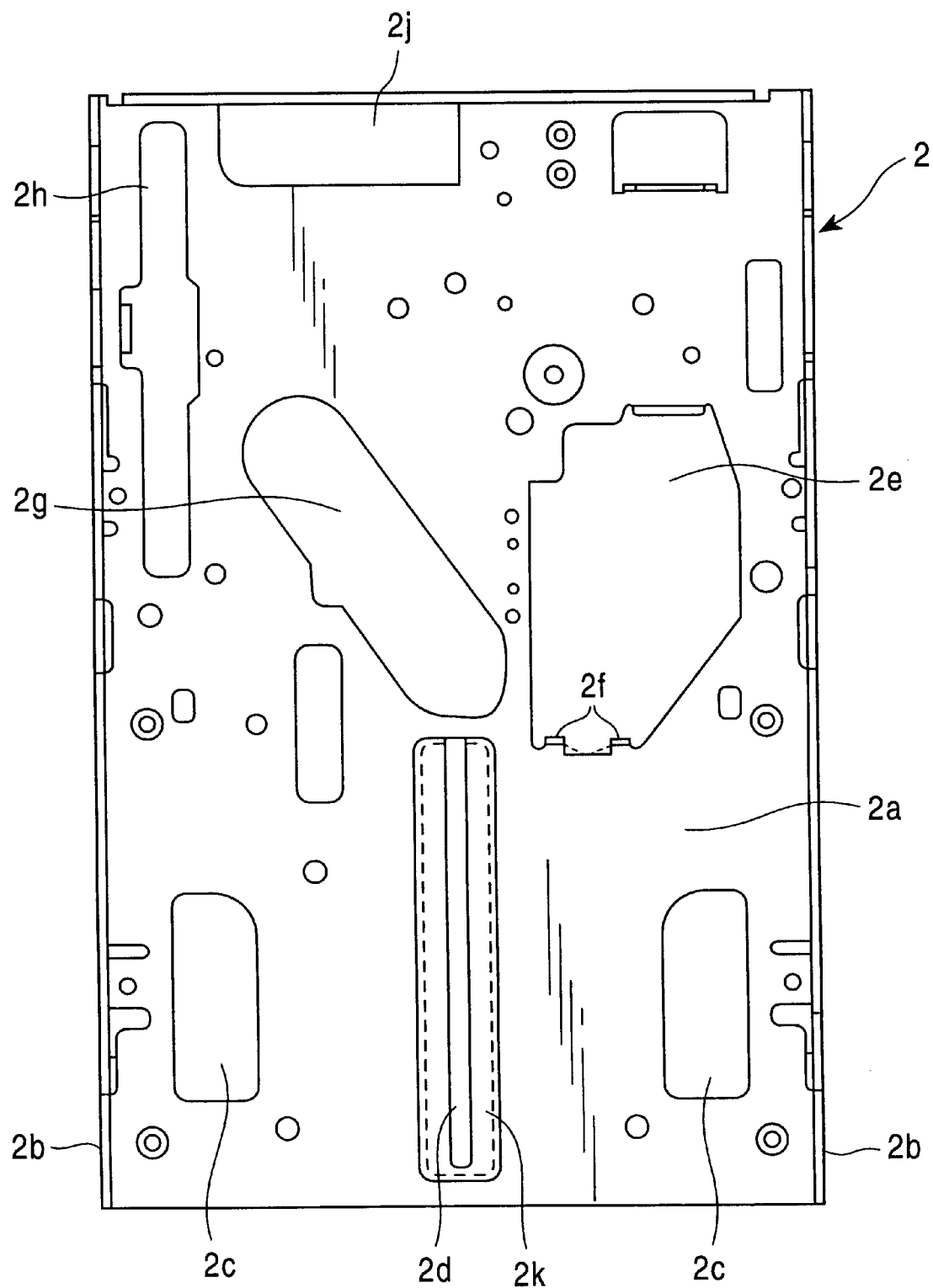
FIG. 4 is a top view of the housing of the magnetic recording/reproducing apparatus in accordance with the present invention.
Figure 5:
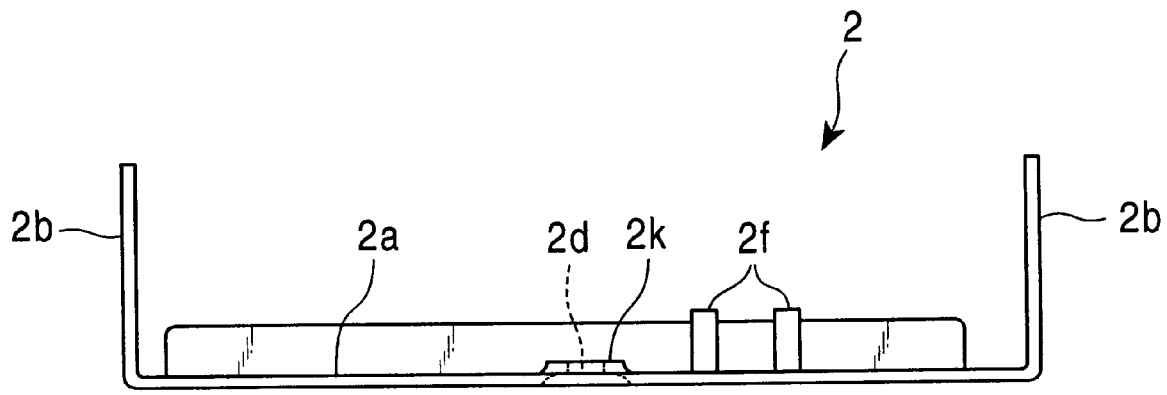
FIG. 5 is a front view of the housing of the magnetic recording/reproducing apparatus in accordance with the present invention.

A pair of substantially rectangular windows 2c and 2c are formed on the left and right bottom portions of the bottom plate 2a of FIG. 4, by, for example, pressing. A long slot 2d, extending vertically in FIG. 4, is formed about midway between the pair of windows 2c and 2c, by, for example, punching operations.

A protrusion 2k, which protrudes from the back side of the bottom plate 2a, is formed so as to define the slot 2d.

A substantially rectangular head mounting hole 2e is formed at the upper right side of the slot 2d in FIG. 4, by, for example, punching operations. Two upwardly extending stoppers 2f are formed at the bottom inside edge defining the slot 2d in FIG. 4, by cutting operations.

A substantially elliptical belt hole 2g, which extends obliquely leftwards and upwards from the top edge of the slot 2d of FIG. 4, is formed. The drive belt (not shown), for rotatably driving a transporting roller 17 (described later), is positioned at the hole 2g. A vertically long opening 2h is punched out at the left (in FIG. 4) of the belt escape hole 2g, and near the left side plate 2b.

A substantially rectangular motor mounting hole 2j is formed at the top leftward end (in FIG. 4) of the magnetic recording/reproducing apparatus 1 in order to mount a drive source 13, which is installed and removed, as a result of sliding the cartridge 4 described later. A plurality of small-diameter, round holes are punched out near the motor mounting hole 2j and other portions of the bottom plate 2a.

Figure 6:
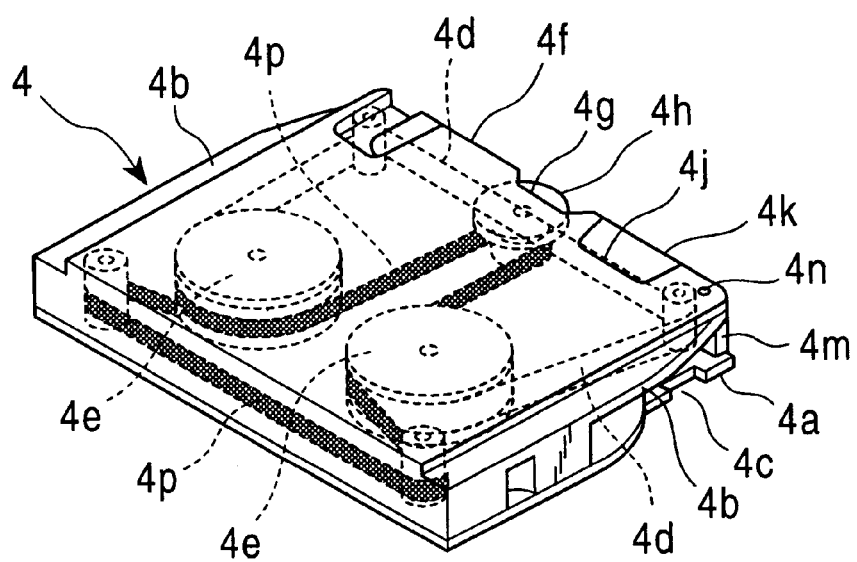
FIG. 6 is a perspective view of the cartridge used in the magnetic recording/reproducing apparatus in accordance with the present invention.

The cartridge 4, which is loaded into the apparatus 1, has a box-like external shape, and, as shown in FIG. 6, has at the left and right side faces thereof two rail-like, upper and lower guide portions 4a and 4b that protrude outwardly from the left and right faces. An engaging portion 4c is formed in each lower guide portion 4a.

The cartridge 4 contains a magnetic tape 4d therein, both ends of which are wound upon rotatable reels 4e and 4e.

A cutout 4g is formed in the center portion of a front face 4f of the cartridge 4, from which cutout 4g a portion of the outer periphery of a rotatable pin roller 4h protrudes. In response to the rotation of the pinch roller 4h, the reels 4e and 4e rotate clockwise or counterclockwise through a tape advancing belt 4p, so that the magnetic tape 4d can be wound and rewound upon the reels 4e and 4e.

At the right side of the cutout 4g of the cartridge 4 is formed an opening 4j for exposing the magnetic tape 4d at the front face 4f in order to slide the magnetic tape 4d with respect to a magnetic head 23 described later. An openable and closable cover member 4k is disposed in the opening 4j.

An edge 4m is formed at the right (in FIG. 6) of the cover member 4k, and is supported by a supporting pin 4n in order to allow the cover member 4j to rotate.

A torsion coil spring (not shown) is wound upon the supporting pin 4n. When the cartridge 4 is not loaded in the apparatus 1, the torsion coil spring causes the cover member to cover the opening 4j at all times to prevent entry of, for example, dirt into the cartridge 4.

As shown in FIG. 3, a first slide member 4 is disposed on the bottom plate 2a of the housing 2. When the cartridge 4 is inserted into the housing 2, the first slide member 5 stops the cartridge 4, and causes it to slide along therewith in the direction of arrow F into the apparatus 1.

The first slide member 5 is formed of a springy, metallic plate, such as a stainless steel plate. As shown in the perspective view of FIG. 7, it is externally E-shaped and has a base 5a at the forward side (in FIG. 7) thereof; arms 5b and 5c at the left and right sides of the base 5a; and a flat link supporting portion 5d at the center portion thereof.

The right forward end of the first slide member 5 is bent upward to form a substantially U-shaped roller holding portion 5e at the forward end of the right arm 5b. The forward end above the roller holding portion 5e is bent outwardly and at right angles in order to form an opening-and-closing portion 5f. When the cartridge 4 is inserted into the apparatus 1, the edge 4m formed at the right of the cover member 4k of the cartridge 4 comes into contact with the opening-and-closing portion 5f which forwardly rotates and opens the cover member 4k.

Figure 7:
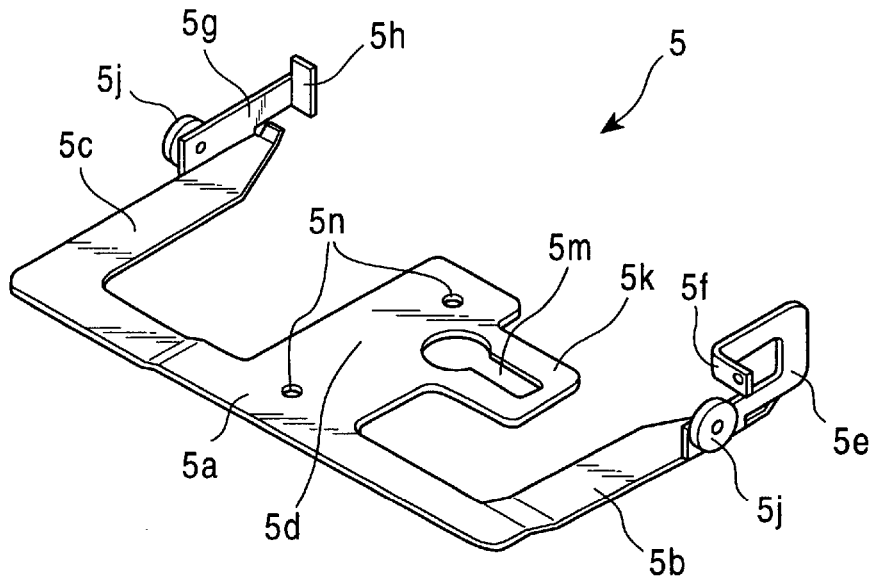
FIG. 7 is a perspective view of the first slide member of the magnetic recording/reproducing apparatus in accordance with the present invention.

The left forward end of the first slide member 5 of FIG. 7 is bent upward to form a roller holding portion 5g at the forward end of the left arm 5c of FIG. 7. The roller holding portion 5g faces the right roller holding portion 5e of FIG. 7.

The forward end of the roller holding portion 5g is bent inwardly and at right angles to form a stopper portion 5h. When the cartridge 4 is placed manually onto the first slide member 5, the front face 4f of the cartridge 4 comes into contact with the stopper portion 5h which prevents the cartridge 4 from being pushed beyond it.

A pair of rotatably supported, opposing stopper portions 5j and 5j, each of which is a stopper roller, are provided at the outer side of their respective roller holding portions 5e and 5g.

A protrusion 5k, which protrudes towards the right arm 5d, is formed at the forward end of the link supporting portion 5d. The protrusion 5k has a punched-out slot or engaging portion 5m which extends perpendicular to the sliding direction of the first slide member 5, that is, perpendicular to the direction of arrow F or the direction of arrow G.

Two mounting holes 5n are formed in the link supporting portion 5d in order to slidably mount the first slide member 5 to the slot 2d in the housing 2.

The first slide member 5 is slidably mounted onto the base plate 2a of the housing 2, so that the stopper portions 5j and 5j can slide on the windows 2c and 2c and the bottom plate 2a.

Figure 8A:
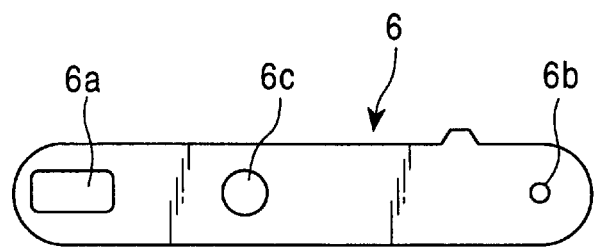
FIG. 8A is a plan view and FIG. 8B is a sectional side view of the link member of the magnetic recording/reproducing apparatus in accordance with the present invention.
Figure 8B:
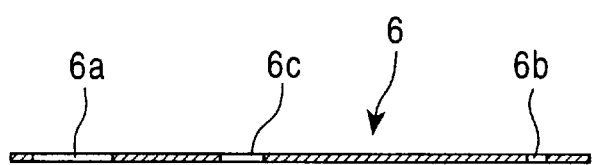

As shown in FIG. 3, one end of a link member 6 engages the engaging portion 5m of the first slide member 5. As shown in FIG. 8, the link member 6 is formed of a flat metallic plate, or the like, with a slot or engaging portion 6a being punched out in the left side of the link member 6 so as to extend in the longitudinal direction thereof.

The link member 6 also has at the right side thereof a round hole 6b and a supporting hole 6c formed between the round hole 6b and the engaging portion 6a. These holes 6c and 6c are punched out from the link member 6 by pressing or the like.

As shown in FIG. 3, the link member 6 is supported at the supporting hole 6c by a fulcrum portion 6d, being a supporting pin mounted to the bottom plate 2a of the housing 2, so as to be rotatable clockwise or counterclockwise.

A linking portion 6e is supported at the round hole 6c formed at one end of the link member 6. When the linking portion 6e is brought into engagement with the engaging portion 5m of the first slide member 5 in order to link the link member 6 and the first slide member 5 and to rotate the link member 6 clockwise or counterclockwise, the linking portion 6e moves within the engaging portion 5m of the slide member 5, whereby the first slide member 5 slides in the direction of arrow F or in the direction of arrow G of FIG. 3.

A second slide member S, shown in FIG. 3, is coupled to the engaging portion 6a of the link member 6. The second slide member S is slidably supported on the bottom plate 2a of the housing 2, and comprises a lower first member portion 7 and an upper second member portion 8. The first and second member portions 7 and 8 are formed by punching out, for example, a metallic plate as a result of pressing operations or the like.

Figure 9:
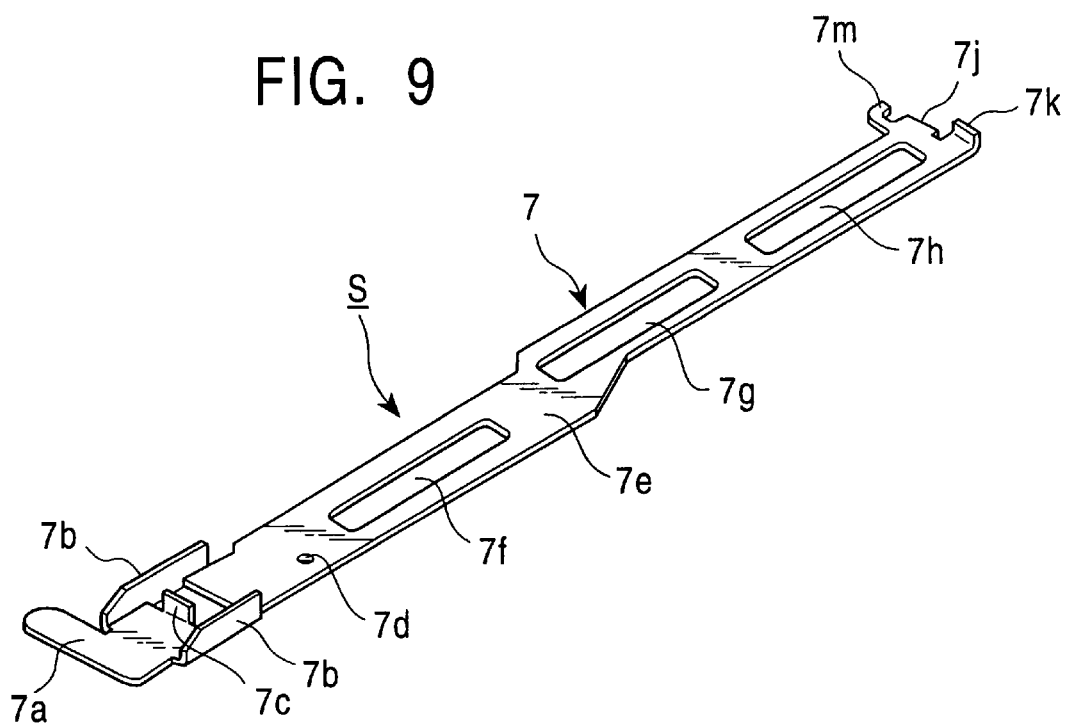
FIG. 9 is a perspective view of the first member portion of the second slide member of the magnetic recording/reproducing apparatus in accordance with the present invention.

As shown in the perspective view of FIG. 9, the front side portion 7a of the first member portion 7 is substantially L-shaped, with the left and right sides of the front side portion 7a of the first member portion 7 being bent upwardly to form two opposing guides 7b and 7b.

A portion of a flat portion 7e, located between the two guides 7b and 7b, is cut and bent upward to form a presser portion 7c.

A mounting hole 7d, with a predetermined diameter, is formed in a portion of the flat portion 7e located behind the guides 7b and 7b. A mounting hole 7f is formed at the forward side of the flat portion 7e, and two mounting holes 7g and 7h are formed behind the mounting hole 7f. These mounting holes 7f, 7g, and 7h are formed so that they are vertically long and to a predetermined width by punching operations.

The two mounting holes 7g and 7h are formed such that they are disposed slightly towards the left of the mounting hole 7f.

The right side of a back edge 7j of the first member portion 7 is bent upward in order to form a stopper portion 7k. A spring stopper portion 7m, with a recess, which protrudes from the flat portion 7e is formed at the left side of the back edge 7j.

As shown in FIG. 3, the first member portion 7 with the above-described structure has a coupling portion 7n that is mounted to the mounting hole 7d by caulking or the like. The coupling portion 7n is inserted into the engaging portion 6a of the link member 6 so that the engaging portion 6a side of the link member 6 does not disengage from the coupling portion 7n and is slidably supported by the first member portion 7 of the second slide member S.

When the first member portion 7 is slid in either the direction of arrow F or in the direction of arrow G of FIG. 3, the coupling portion 7n, mounted to the first member portion 7, moves within the engaging portion 6a of the link member 6, causing the link member 6 to rotate and the first slide member 5, coupled to one end of the link member 6, to slide in a direction opposite to the sliding direction of the second slide member S. For example, when the second slide member S slides in the direction of arrow G, the first slide member 5 slides in the direction of arrow F.

By inserting three pins 7p, which are fixed to the bottom plate 2a of the housing 2 of FIG. 3 by caulking or the like, into the aforementioned three mounting holes 7f, 7g, and 7h, the first member portion 7 is supported by the bottom plate 2a so as to be slidable vertically therealong.

Figure 10:
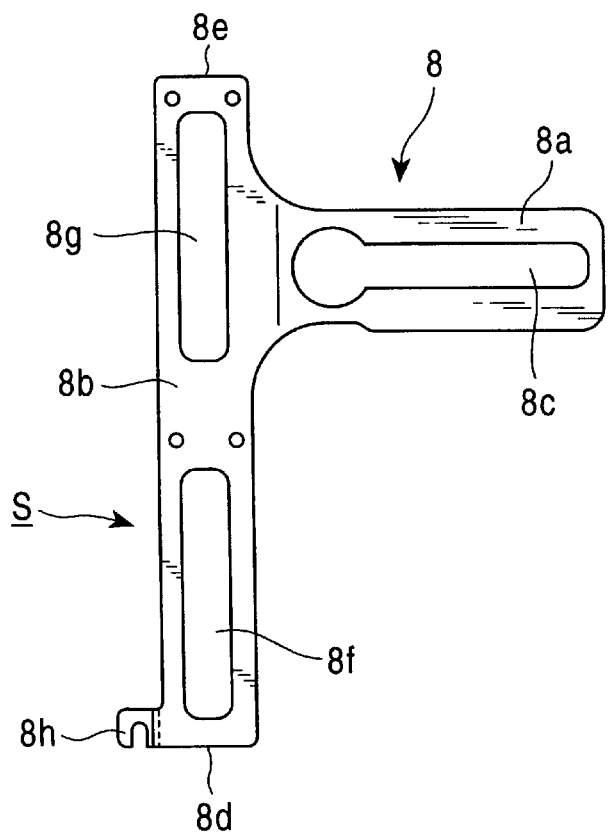
FIG. 10 is a plan view of the second member portion of the second slide member of the magnetic recording/reproducing apparatus in accordance with the present invention.

A second member portion 8, shown in FIG. 10, is slidably disposed on the flat portion 7e and towards the back edge 7j of the first member portion 7.

The second member portion 8 of the second slide member S is formed of, for example, a metallic plate, and is externally substantially T-shaped. It has a base 8a, which extends horizontally, and a vertically long supporting portion 8b, which extends perpendicular to the direction in which the base 8a extends.

A horizontally long cam groove 8c is punched out from the base 8a so as to be substantially rectangular at one end and circular at the other end. In FIG. 10, a front end 8d is formed below the supporting portion 8b, while a back end 8e is formed above the supporting portion 8b. Two rectangular, horizontally long mounting holes 8f and 8g are punched out from the supporting portion. 8b. A spring stopper portion 8h, with a recess, is formed so as to protrude from the left side of the front end 8d located below the supporting portion 8b.

As shown in FIG. 3, the mounting holes 8f and 8g of the second member portion 8 having the above-described structure are inserted onto the two pins 7p and 7p that have inserted thereon the mounting holes 7g and 7h of the first member portion 7. This causes the second member portion 8 to be slidably mounted onto the first member portion 7.

In the second slide member S, a resilient member 9, being a coil spring or the like, is tightly stretched between the spring stopper portion 7m of the first member portion 7 and the spring stopper portion 8h of the second member portion 8. The resilient force produced by the resilient member 9 causes the back end 8e of the second member portion 8 to be in contact with the stopper portion 7k of the first member portion 7.

Sliding the second member portion 8 causes the first member portion 7 to slide in the same direction as the second member portion 8 through the resilient member 9, whereby the link member 6 is rotated.

As shown in FIG. 3, a cam member 10 is disposed under the base 8a of the second member portion 8. It is formed of, for example, a metallic plate, and has a gear at the outer periphery thereof. The cam member 10 is rotatably supported at the bottom surface 2a of the housing 2a by a shaft. A drive pin 10a is mounted, by caulking or the like, to a portion of the cam member 10 separated from the center of rotation of the cam member 10.

In FIG. 3, at the right side of the cam member 10 are disposed a pinion gear 11a, which engages the gear at the outer periphery of the cam member 10, and a double gear structure 11. The double gear structure 11 has a flat gear portion 11b with a large diameter, and is rotatably supported at the bottom plate 2a of the housing 2 by a shaft.

A double pinion structure 12 is disposed above the double gear structure 11 so as to engage the flat gear portion 11b of the double gear structure 11. The double pinion structure 12 is rotatably supported at the bottom plate 2a of the housing 2 by a shaft. In the double pinion structure 12, an upper pinion and a lower pinion, with different diameters, are integrally formed. The upper pinion is called small pinion gear 12a and engages the flat gear portion 11b of the double gear structure 11, whereas the lower pinion is called large pinion gear 12b being externally larger than the small pinion gear 12a.

The drive source 13, such as a motor, is mounted to the motor mounting hole 2j formed above the cam member 10 in FIG. 3. A worm gear 13a is, for example, press-fitted to the rotating shaft of the drive source 13, and meshes the large pinion 12b of the double pinion structure 12.

Figure 11:
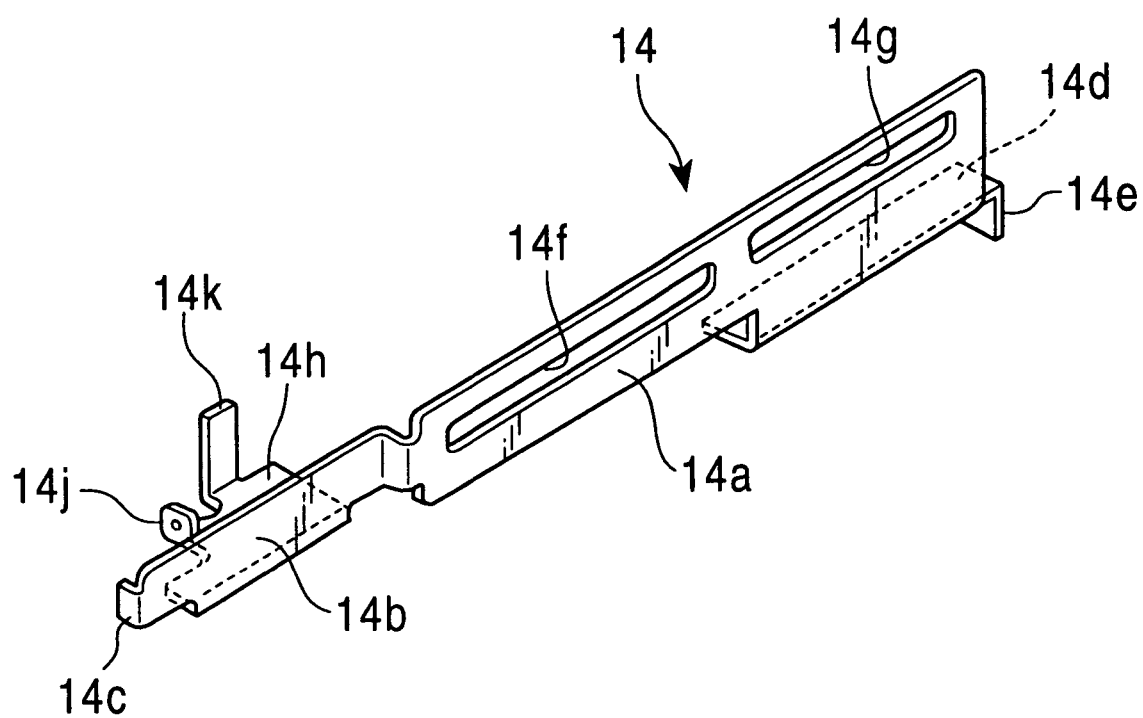
FIG. 11 is a perspective view of the operating member of the magnetic recording/reproducing apparatus in accordance with the present invention.

A vertically long operating member 14, shown in FIG. 11, is slidably mounted to the right side plate 2b of the housing 2 of FIG. 3. The operating member 14 is formed of a metallic plate or the like. It comprises a mounting portion 14a slidably mounted to the right side plate 2b; and an arm 14b formed to the left of and stepped from the mounting portion 14a. The front portion of the operating portion 14 is bent leftwards to form a front end 14c of the arm 14b.

The bottom side of the mounting portion 14a is bent leftwards to form a tabular operating portion 14d. The back portion of the operating portion 14 is bent downwards to form a back end 14 which merges the operating portion 14d.

Two mounting holes 14f and 14g, which extend in the longitudinal direction of the mounting portion 14a, is punched out so as to be disposed side by side towards the top end of the mounting portion 14a.

A bottom plate 14h is formed by bending leftwards the bottom side of the arm 14b. The forward end of the bottom plate 14h is bent upward to form a spring stopper portion 14j with a round hole.

By bending the left side edge of the bottom plate 14h, a contact portion 14k is formed at the left side of the arm 14h so as to oppose it.

When the cartridge 4 is loaded onto the first slide member 5, the contact portion 14k of the operating member 14 is pushed by the right edge of the front face 4f of the cartridge 4, causing the operating member 14 to slide, along with the cartridge 4, into the apparatus.

A coil spring 15 is tightly stretched between the spring stopper portion 14j of the operating member 14 and the opening-and-closing portion 5f of the first slide member 5. When the cartridge 4, loaded in the apparatus 1, is to be ejected therefrom, sliding the first slide member 5 in the direction of arrow G causes the operating member 14 to be pulled by the coil spring 15 and be slid in the direction of arrow G towards the cartridge insertion opening 1a.

A transporting roller 17 is mounted at the left of the head mounting hole 2e of the bottom plate 2a of the housing 2 of FIG. 3. It can be rotated by operating another drive source (not shown). A friction-generating member, such as rubber, is mounted to the outer periphery of the transporting roller 17, which prevents slippage of the pinch roller 4h in the cartridge 4 when the pinch roller 4h of the cartridge 4 press-contacts the transporting roller 17 and rotates.

A magnetic head 18, which is mounted to a member (not shown), is disposed towards the two stoppers 2f at the head-mounting hole 2e.

A vertically long operating member 19 is mounted at the inner side of the left side plate 2b disposed towards the front face of the housing 2 of FIG. 3 so as to be slidable in the direction of arrows F and G.

The operating member 19, which is formed of a transparent light-guiding material, such as an acrylic material, has an indicator portion 19a formed so as to protrude from the front end face of the housing 2.

Figure 12A:
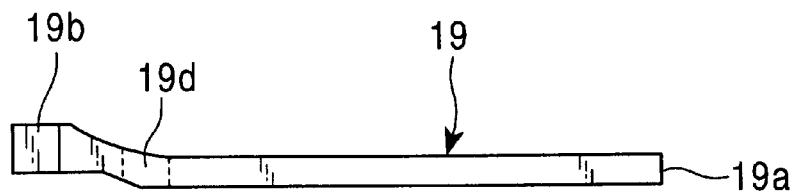
FIGS. 12A and 12B are sectional side views of the operating member, illustrating the operation of the magnetic recording/reproducing apparatus in accordance with the present invention.
Figure 12B:
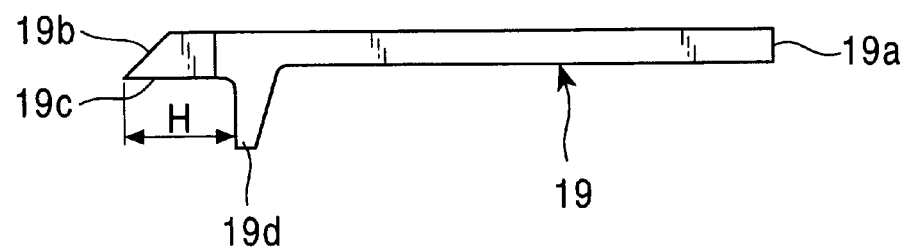

As shown in the plan view of FIG. 12A and the side view of FIG. 12B, the operating member 19 is formed such that its back end surface is inclined by about 45 degrees to form a flat, inclined surface, which is covered with aluminum foil, white paint, or any other reflecting material, in order to form a reflecting portion 19b at the inclined surface.

The operating member 19 has a flat side wall 19c at the lower surface thereof. An illumination light beam J from a light-emitting member 21 (described later) enters the side wall 19c, which has a size H as measured from the front end of the reflecting portion 19b.

An operating portion 19d, which protrudes downwards, is formed with a predetermined height towards the indicator portion 19c of the side wall 19c having the aforementioned size H.

Figure 13:
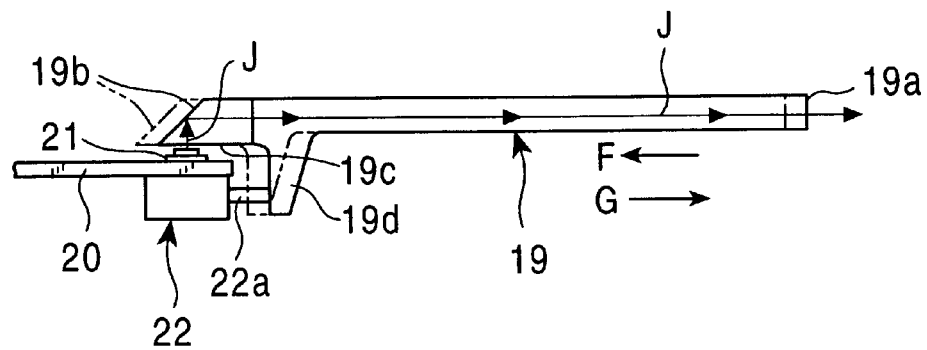
FIG. 13 is a sectional side view of the operating member, the board, the light-emitting member, and the detecting member, illustrating the operation of the magnetic recording/reproducing apparatus in accordance with the present invention.

As shown in FIG. 13, a board 20, being a printed board, is disposed below the side wall 19c of the operating member 19. The light-emitting member 21, which comprises light-emitting diodes (LEDs) and emit illumination light J, is mounted onto the top surface of the board 20 by soldering or the like.

The light-emitting member 21 is mounted near the side wall 19c so as to oppose it.

A detecting member 22, being a nonlock type push switch, is mounted onto the under side of the board 20 by soldering or the like. The detecting member 22 detects the sliding position of the operating member 19, and has an operating lever 22a which slides in order to switch an internal switch circuit. The operating lever 22a is formed so as to protrude externally of the detecting member 22.

A restoring spring (not shown) is disposed in the detecting member 22. It causes the operating lever 22a, pressed in the direction of arrow F, to slide in the direction of arrow G in order to be restored back to its original position. When the operating member 19 slides in the direction of arrow F, the operating portion 19d presses the operating lever 22a of the detecting member 22 to turn on the detecting member 22.

After operation of the detecting member 22 by means of the operating member 19, the operating member 19 returns to the front side of the housing 2 by the restoring spring (not shown).

A description will now be given of the operation of the apparatus 1, having the above-described structure, of the present invention. In the interior of the apparatus 1 prior to insertion of the cartridge 4 therein, as shown in FIG. 3, the first slide member 5 is disposed adjacent to the cartridge insertion opening 1a, and the stopper portions 5j and 5j, being a pair of stopper rollers, are at the windows 2c and 2c of the housing 2, respectively.

When the cartridge 4, represented by alternate long and two short dashed lines, is to be loaded in the apparatus 1 having its aforementioned component parts positioned thus, the cartridge 4 is inserted in the direction of arrow F from the cartridge insertion opening 1a. This causes the left and right guide portions 4a and 4b to be guided along the guiding rails (not shown) formed at the cartridge insertion opening 1a side of the left and right side plates 2b and 2b of the housing 2, whereby the cartridge 4 moves into the housing 2.

Figure 14:
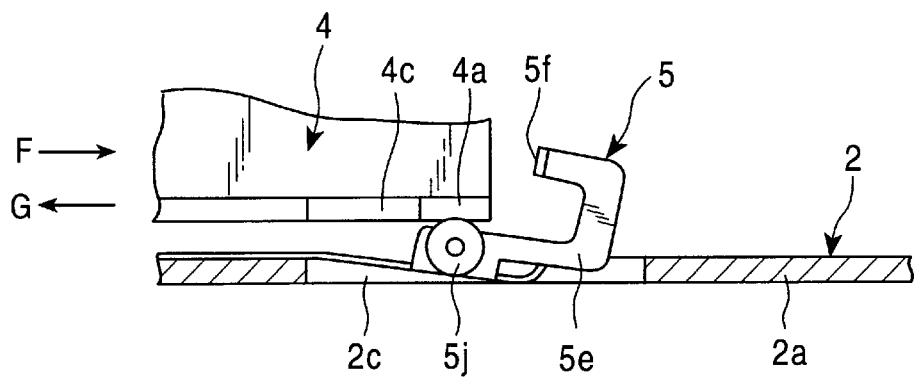
FIG. 14 is a sectional side view of the housing, the cartridge, and the first slide member, illustrating the operation of the magnetic recording/reproducing apparatus in accordance with the present invention.

This causes the front end of the guide portions 4a of the cartridge 4 to push down the stopper portions 5j and 5j of the first slide member 5 into the windows 2c and 2c of the housing 2, respectively, as shown in FIG. 14.

From this state, further pushing the cartridge 4 into the apparatus 1 causes the edge 4m located adjacent to the cover member 4k of the cartridge 4 to come into contact with the opening-and-closing portion 5f of the first slide member 5, causing the cover member 4k to be opened forwardly from the cartridge 4.

Figure 15:
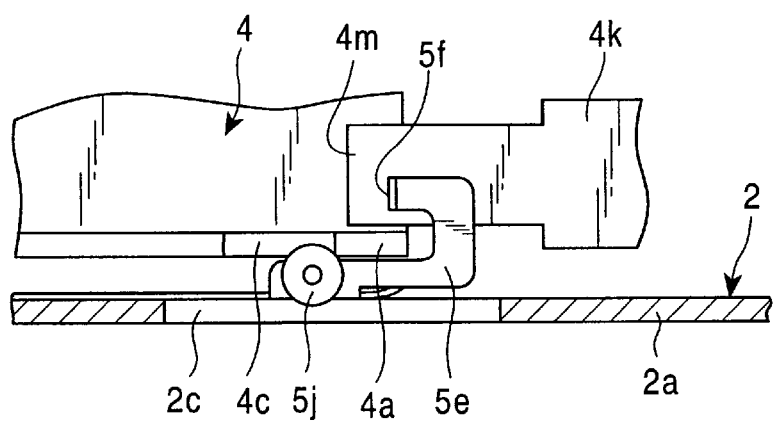
FIG. 15 is a schematic top view of the housing, the cartridge, and the first slide member, illustrating the operation of the magnetic recording/reproducing apparatus in accordance with the present invention.

When the cartridge 4 is further pushed into the apparatus 1 at the same time that the cover member 4k opens, or after the cover member 4k has opened, the stopper portions 5j that were pushed down into their respective windows 2c of the housing 2 are, as shown in FIG. 15, positioned at the engaging portions 4c, at the windows 2c. The stopper portions 5j return back to their original horizontal positions as a result of the resiliency of the first slide member 5, and stop the engaging portions 4c of the cartridge 4.

By restoring the stopper portions 5j back to their horizontal positions as a result of the resiliency of the first slide member 5, a tactile feel is produced at the cartridge 4, making it possible for the operator to know that the cartridge 4 has been loaded onto the first slide member 5 as a result of stopping the cartridge 4 by the stopper portions 5j of the first slide member 5.

Inertial force produced by insertion of the cartridge 4 into the apparatus 1 causes the cartridge 4 to be pushed further inward into the apparatus 1. The left end of the front face 4f of the cartridge 4 comes into contact with the stopper portion 5h of the first slide member 5, which prevents the cartridge 4 from being further inserted into the apparatus 1.

By loading the cartridge 4 onto the first slide member 5, the right end of the front face 4f of the cartridge 4 comes into contact with the contact portion 14k of the operating member 14 in order to move the operating member 14 into the apparatus 1.

This causes the operating portion 14d of the operating member 14 to turn on a switch (not shown), causing driving operations of the drive source 13 to be started.

The driving power of the drive source 13 is transmitted through the double pinion gear structure 12 of FIG. 3 to the double gear structure 11 and the cam member 10, causing the cam member 10 to rotate.

Figure 17:
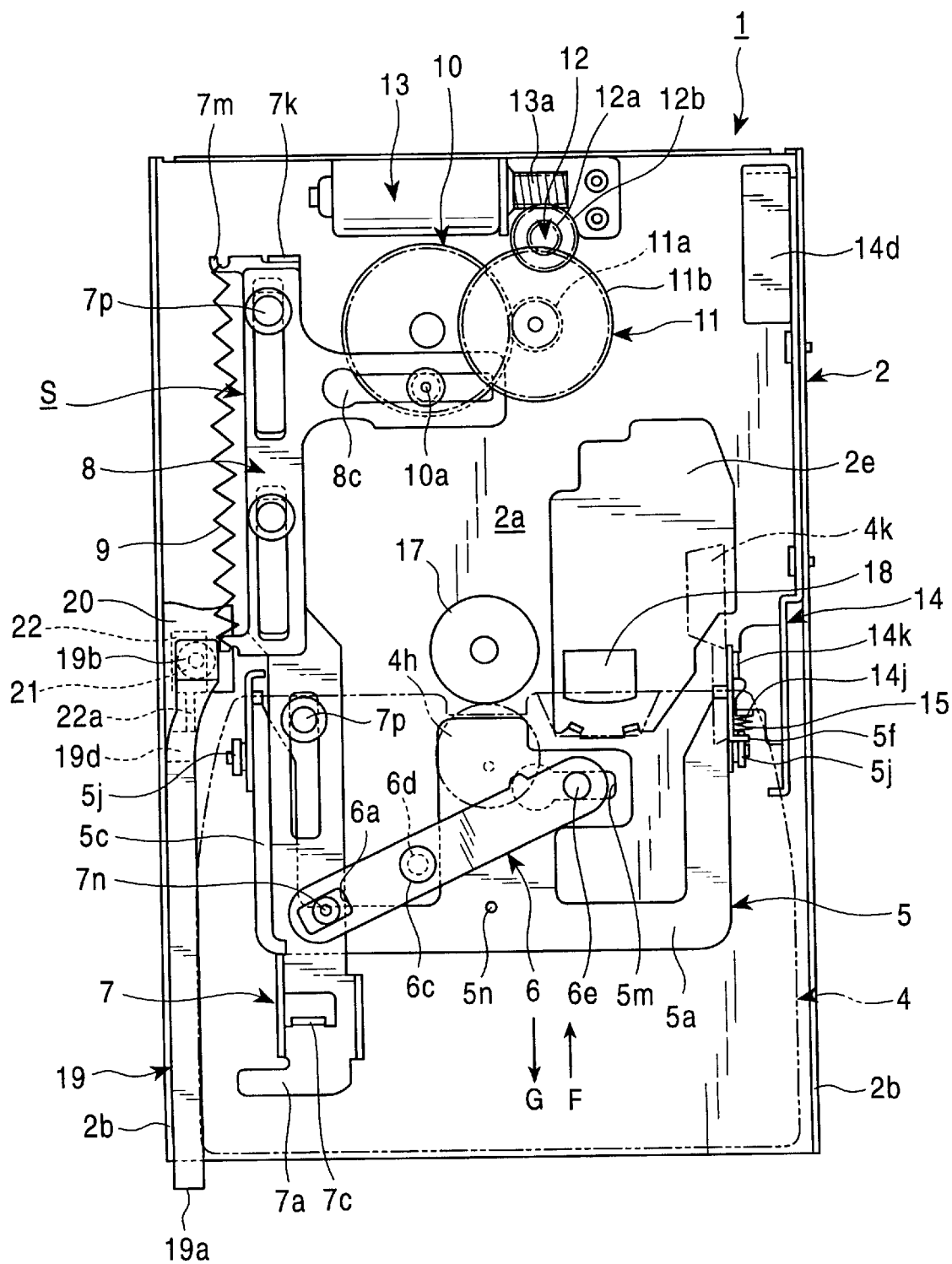
FIG. 17 is a schematic top view of the magnetic recording/reproducing apparatus in accordance with the present invention, illustrating the operation thereof.
Figure 18:
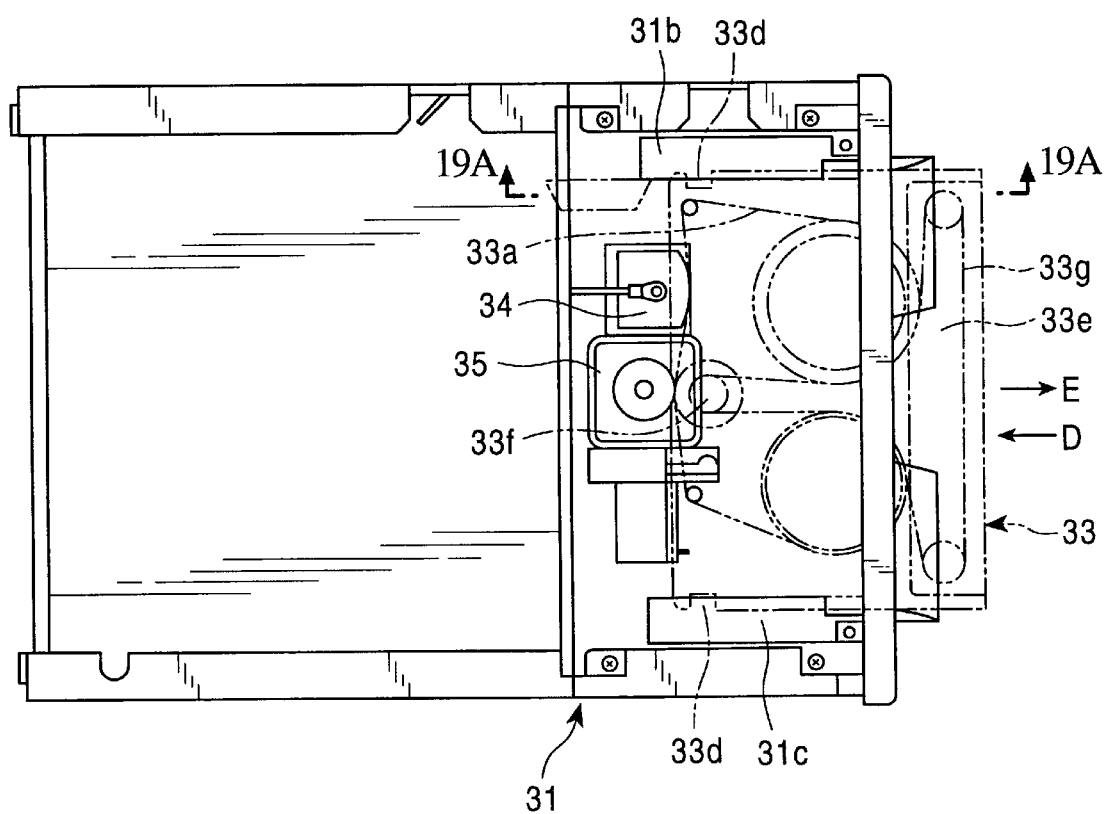
FIG. 18 is a schematic plan view of a conventional magnetic recording/reproducing apparatus.
Figure 19A:
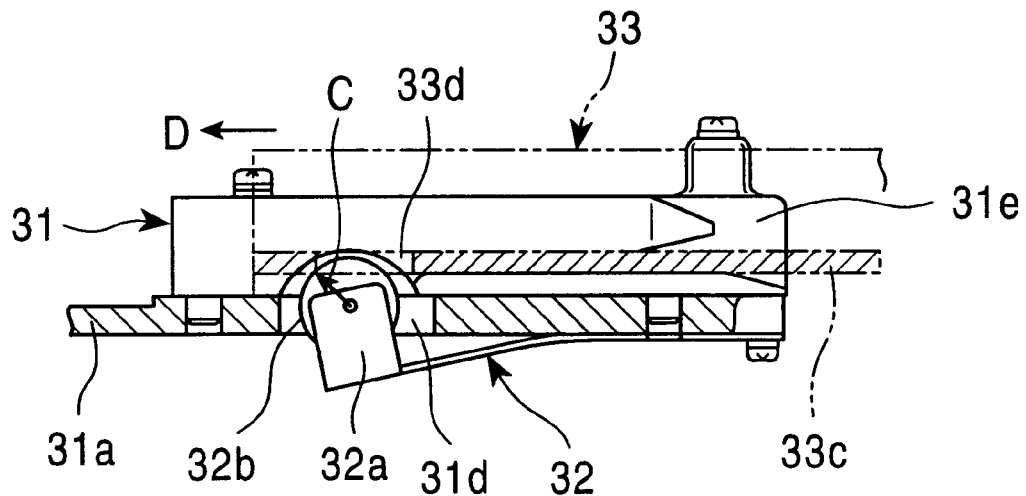
FIG. 19A is a sectional view and FIG. 19B is a side view of the main portion of the conventional magnetic recording/reproducing apparatus.
Figure 19B:
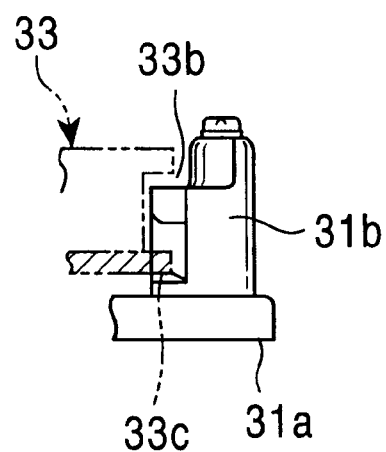

As the cam member 10 rotates, the drive pin 10a disposed at the upper portion of FIG. 3 moves within the cam groove 8c of the second member portion 8 of the second slide member S and downward to a position shown in FIG. 17, and the drive pin 1a causes the second member portion 8 to slide in the direction of arrow G.

This causes the first member portion 7 to slide in the same direction as the second member portion 8, that is, in the direction of arrow G, whereby the link member 6, whose left portion is positioned upwardly of its right portion in FIG. 3, rotates counterclockwise, so the left portion of the link member 6 moves downward, as shown in FIG. 17.

The counterclockwise rotation of the link member 6 causes the first slide member 5, on which the cartridge 4 is loaded, to slide in a direction opposite to the sliding direction of the second slide member S, that is, in the direction of arrow F.

Figure 16:
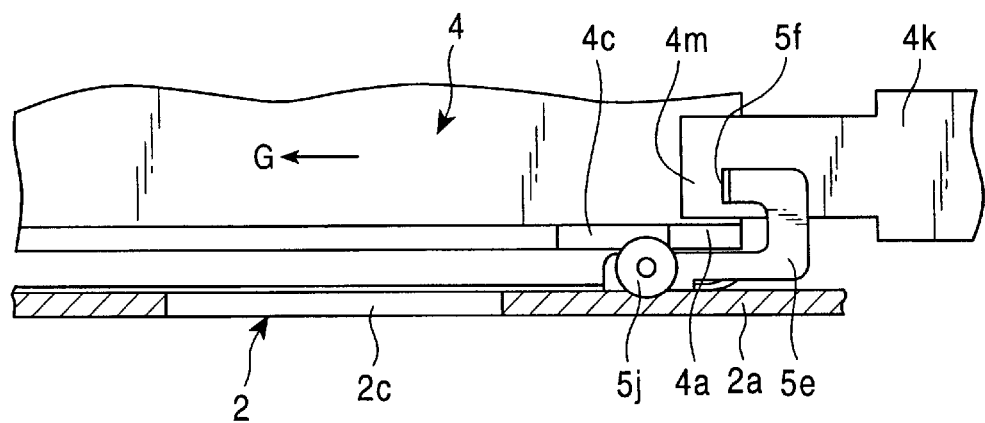
FIG. 16 is a schematic view of the transporting roller unit of the magnetic recording/reproducing apparatus in accordance with the present invention.

As shown in FIG. 16, this causes the stopper portions 5j, disposed at the windows 2c of the bottom plate 2a, to slide onto the bottom plate 2a of the housing 2, whereby the downward movement of the stopper portion 5j is prevented, making it possible to keep the engaging portions 4c of the cartridge 4 stopped by the stopper portion 5j.

As a result, even when an operator tries to pull out the cartridge 4 from the apparatus 1, he or she cannot remove it therefrom, since the stopper portions 5j cannot move downward into their respective windows 2c.

Accordingly, when the cartridge 4 is stopped by the stopper portions 5j, and the first drive source 13 is further driven, the second slide member S slides in the direction of arrow G, causing the link member 6 to move further in the counterclockwise direction. This causes the pinch roller 4h of the cartridge 4 to press contact the transporting roller 17, and the cartridge 4 to be loaded in the apparatus 1.

When the cartridge 4 is loaded into the apparatus 1, the drive source 13 stops rotating.

Here, the magnetic tape 4d is brought into sliding contact with the tape sliding contact surface of the magnetic head 18, and the first slide member 5 and the second slide member S stop sliding.

When the cartridge 4 is loaded into the apparatus 1, and the drive source 13 stops rotating, a command from an external computer (not shown), or the like, causes rotation of a different drive source (not shown), causing rotation of the transporting roller 17. The rotation of the transporting roller 17 causes rotation of the pinch roller 4h of the cartridge 4 press-contacting the transporting roller 17.

In response to the rotation of the pinch roller 4h, the reels 4e rotate through the tap advancing belt 4p, as a result of which the magnetic tape 4d is transported upstream or downstream with respect to the magnetic head 18, allowing recording or reproducing operations to be carried out on the magnetic tape 4d.

While recording or reproducing operations are being carried out on the magnetic tape 4d, a command from an external computer (not shown) causes the light-emitting member 21, mounted to the base plate 20, to emit illumination light J towards the side wall 19c of the operating member 19. As shown in FIG. 13, the illumination light J travels into the operating member 19 from the side wall 19c of the operating member 19.

The illumination light J, which has entered the operating member 19, strikes and is bent at right angles by the reflecting portion 19b, being an inclined surface at the back end of the operating member 19. The bent illumination light J is then guided to the indicator portion 19a at the front end face of the operating member 19. The illumination light J, which has been guided to the indicator portion 19a, causes the indicator portion 19a to emit light, making it possible for any operator to confirm from outside the apparatus 1 that recording or reproducing operations are being carried out on the magnetic tape 4d.

Thus, it is possible to prevent incorrect operations, such as accidentally inserting another cartridge 4 into the apparatus 1 during recording or reproducing operations.

The operator can eject the cartridge 4 from the apparatus 1 after the predetermined recording or reproducing operations have been carried out on the magnetic tape 4d by lightly pressing the indicator portion 19a of the operating member 19, disposed at the front face side of the apparatus 1, with, for example, his or her finger, and sliding it in the direction of arrow F.

When this is done, the operating member 19 of FIG. 13 moves in the direction of arrow F to the location indicated by dashed lines, and presses the operating lever 22a. This causes the switch circuit in the detecting member 22 to be switched, turning on the detecting member 22.

When the detecting member 22 is turned on, driving of the drive source 13 is started to rotate the cam member 10, causing the drive pin 10a to move upward in FIG. 3, whereby the second slide member S moves in the direction of arrow F. The link member 6 rotates clockwise with the fulcrum 6d as center of rotation, causing the first slide member 5, linked to the linking portion 6e of the link member 6, to move in the direction of arrow G, towards the cartridge insertion opening 1a.

This causes the stopper portions 5j of the first slide member 5, which were positioned on the bottom plate 2a of FIG. 16, to move to their respective windows 2c of the bottom plate 2a of the housing 2 of FIG. 15. When the stopper portions 5j are at their respective windows 2c, the cartridge 4 is still stopped by the stopper portions 5j. Then, the back end side of the cartridge 4, indicated by alternate long and two short dashed lines in FIG. 3, is ejected from the front face side of the apparatus 1, after which the operating member 14 operates a switch (not shown) to stop the rotation of the drive source 13.

Pulling out the cartridge 4 with the rotation of the drive source 13 stopped causes the guide portions 4a of the cartridge 4 to press the stopper portions 5j downward into the windows 2c, thereby facilitating removal of the cartridge 4 from the apparatus 1.

Turning on the detecting member 22 at the same that the cartridge 4 is ejected causes a signal to be transmitted to the external computer, or the like, to indicate that an eject operation instruction has been given. The giving of the eject operation instruction is indicated to the operator by turning off the light-emitting member 21.

In the embodiment, the state of operation of the apparatus 1 can be indicated by turning the light-emitting member 21 on and off. When recording or reproducing operations are carried out on the magnetic tape 4d, the light-emitting member 21 is made to emit light. It is to be noted that the light-emitting member 21 can also be made to emit light during the standby state prior to carrying out recording or reproducing operations on the magnetic tape 4d contained in the cartridge 4 loaded in the apparatus 1.

In addition, the light-emitting member 21 may be composed of two-color light-emitting diodes in order to emit one color during the standby state prior to recording or reproducing operations on the magnetic tape 4d and the other color while recording or reproducing operations are being carried out on the magnetic tape 4d.

This allows not only confirmation that recording or reproducing operations are being carried out on the magnetic tape 4d, but also confirmation that the cartridge 4 has been loaded into the apparatus 1 and is in a standby state. This reduces the number of incorrect operations.

According to the present invention, the magnetic recording/reproducing apparatus comprises a light-emitting member for emitting illumination light depending on the state of operation of the cartridge, and an operating member formed of light-guiding material. The illumination light from the light-emitting member enters the operating member, and is guided outwardly of the housing by the operating member in order to indicate the state of operation. Therefore, when, for example, the light-emitting member is made to emit light during recording or reproducing operations carried out on the magnetic tape, the operator can know that recording or reproducing operations are being carried out on the magnetic tape by looking at the operating member once, making it possible to prevent incorrect operations and failures resulting therefrom.

Since the operating member, which is formed of a light-guiding material, guides illumination light out of the housing in order to indicate the state of operation, one member can be used for operating the detecting member as well as for indicating the state of operation by the illumination light from the light-emitting member. Therefore, it is possible to provide a small magnetic recording/reproducing apparatus.

The operating member has an indicator portion at the front end surface thereof disposed outside the housing. It also has a side wall into which illumination light from the light-emitting member enters; and a reflecting portion at the back end surface thereof in order to bend the illumination light, which has entered from the side wall, towards the indicator portion. The illumination light, which has entered the operating member, is guided towards the indicator portion by the reflecting portion. Therefore, it is possible to guide the illumination light, emitted from the light-emitting member, to the indicator portion without any loss and allow the indicator portion to emit a bright light. This allows any operator to reliably confirm from outside the apparatus that recording or reproducing operations are being carried out on the magnetic tape.

The reflecting portion is formed by forming the back end surface of the operating member into a flat, inclined surface and covering the inclined surface with a reflecting material. The illumination light, which has entered from the side wall of the operating member, is bent by the reflecting portion and guided towards the indicator portion. Therefore, aluminum foil, white paint, or any other reflecting material may be used for the reflecting portion, making it unnecessary to use, for example, an expensive prism. This allows a cheap magnetic recording/reproducing apparatus to be provided.

The light-emitting member emits light either during standby state prior to recording or reproducing operations carried on the magnetic tape contained in the cartridge loaded in the apparatus or during recording or reproducing operations carried out on the magnetic tape. Therefore, the operator can find out the state of operation of the cartridge from outside the apparatus by looking at the operating member once. This makes it possible to provide a magnetic recording/reproducing apparatus which can prevent incorrect operations, such as accidental insertion of another cartridge into an apparatus which already has a cartridge loaded therein, and failures resulting therefrom.

The light-emitting member and the detecting member are mounted onto the same board such that the detecting member is disposed close to the light-emitting member. The illumination light, emitted from the light-emitting member, is allowed to enter the operating member. The operating member slides in order to operate the detecting member, which drives the drive source, whereby the cartridge in the loaded state is ejected from the apparatus. Therefore, the light-emitting member and the detecting member can be disposed on one board, which reduces the size of the board and allows it to be disposed at the back side of the apparatus. This allows a small magnetic recording/reproducing apparatus to be provided.

Since the cartridge can be ejected from the apparatus by electrical power generated as a result of driving the drive source, the cartridge can be ejected readily with a small force.

The detecting member is a nonlock type switch with a restoring spring therein. After operation of the detecting member as a result of sliding the operating member towards the inner side of the housing, the operating member slides and returns back to the front face side of the housing as a result of the restoring spring. Therefore, the drive source can be driven by electrical power to easily eject the cartridge by simply pressing the operating member with a small force.

What is claimed is:

1. A magnetic recording/reproducing apparatus for a cartridge containing a magnetic tape therein, the apparatus comprising:

a first slide member for sliding the cartridge in order to load or unload the cartridge;

a second slide member for sliding the first slide member;

a drive source for sliding the second slide member;

a housing for separately and slidably supporting the first slide member and the second slide member;

a detecting member, disposed in the housing, for driving the drive source;

a slidable operating member for operating the detecting member, the operating member being formed of a light-guiding material; and a light-emitting member for emitting illumination light depending on the state of operation of the cartridge;

wherein the illumination light from the light-emitting member enters the operating member, which guides the illumination light outwardly of the housing to indicate the operation state.

2. A magnetic recording/reproducing apparatus according to claim 1, wherein the operating member comprises an indicator portion at the front end face thereof situated outside the housing, a side wall for allowing the illumination light from the light-emitting member to enter therein, and a reflecting portion situated at the back end face thereof in order to bend the illumination light that has entered the side wall towards the indicator portion, whereby the illumination light, which has entered the operating member, is guided towards the indicator portion by the reflecting portion.

3. A magnetic recording/reproducing apparatus according to claim 2, wherein the reflecting portion comprises a flat, inclined surface covered with a reflecting material, the inclined surface being for med at the back end of the operating member, in order to bend and guide the illumination light that has entered from the side wall of the operating member towards the indicator portion.

4. A magnetic recording/reproducing apparatus according to claim 1, wherein the light-emitting member emits light during a t least one of standby prior to recording or reproducing operations carried out on the magnetic tape contained in the cartridge loaded in the apparatus, or recording or reproducing operations carried out on the magnetic tape.

5. A magnetic recording/reproducing apparatus according to claim 1, wherein the light-emitting member and the detecting member are mounted on the same board such that the detecting member is disposed near the light-emitting member; and wherein the illumination light from the light-emitting member enters the operating member, and the operating member is slid to operate the detecting member, which causes the drive source to be driven, whereby the cartridge, installed in the apparatus, is ejected.

6. A magnetic recording/reproducing apparatus according to claim 1, wherein the detecting member comprises a nonlock type switch having a restoring spring therein; and wherein after operating the detecting member as a result of sliding the operating member towards the inner portion of the housing, the operating member slides and returns back to the front face side of the housing due to the restoring spring.

* * * * *

UNITED STATES PATENT AND TRADEMARK OFFICE
CERTIFICATE OF CORRECTION

PATENT NO.    : 6,128,158
DATED         : October 3, 2000
INVENTOR(S)   : Shoichiro Saito et al.

It is certified that error appears in the above-identified patent and that said Letters Patent is hereby corrected as shown below:

Claim 3,
Line 4, change "for med" to -- formed --.

Claim 4,
Line 3, change "a t" to -- at --.

Signed and Sealed this

Twenty-fifth Day of December, 2001

Attest:

JAMES E. ROGAN
Attesting Officer    Director of the United States Patent and Trademark Office